United States Patent
Kataoka et al.

(10) Patent No.: US 8,345,042 B2
(45) Date of Patent: Jan. 1, 2013

(54) MESH-BASED SHAPE RETRIEVAL SYSTEM

(75) Inventors: Ichiro Kataoka, Hitachinaka (JP);
 Ichiro Harashima, Hitachiomiya (JP)

(73) Assignee: Hitachi, Ltd., Tokyo (JP)

( * ) Notice: Subject to any disclaimer, the term of this patent is extended or adjusted under 35 U.S.C. 154(b) by 995 days.

(21) Appl. No.: 11/695,655

(22) Filed: Apr. 3, 2007

(65) Prior Publication Data

US 2007/0242083 A1   Oct. 18, 2007

(30) Foreign Application Priority Data

Apr. 7, 2006 (JP) ................................ 2006-106662

(51) Int. Cl.
 *G06T 17/00* (2006.01)
(52) U.S. Cl. ....................................................... 345/420
(58) Field of Classification Search .................. 382/156; 345/623
 See application file for complete search history.

(56) References Cited

U.S. PATENT DOCUMENTS

| | | | | |
|---|---|---|---|---|
| 5,111,516 | A * | 5/1992 | Nakano et al. | 382/156 |
| 6,307,555 | B1 * | 10/2001 | Lee | 345/423 |
| 2002/0042703 | A1 * | 4/2002 | Furusu et al. | 703/11 |
| 2003/0011589 | A1 * | 1/2003 | Desbrun et al. | 345/418 |
| 2003/0090526 | A1 * | 5/2003 | Nishigaki et al. | 345/810 |
| 2004/0175039 | A1 * | 9/2004 | Miller | 382/181 |
| 2004/0264777 | A1 | 12/2004 | Furuhashi et al. | |
| 2005/0002571 | A1 * | 1/2005 | Hiraga et al. | 382/218 |
| 2005/0168460 | A1 * | 8/2005 | Razdan et al. | 345/419 |
| 2005/0229136 | A1 * | 10/2005 | Yuda et al. | 716/11 |

FOREIGN PATENT DOCUMENTS

| | | |
|---|---|---|
| JP | 2001-117907 | 4/2001 |
| JP | 2004-288170 | 10/2004 |

* cited by examiner

*Primary Examiner* — Edward Martello
(74) *Attorney, Agent, or Firm* — Antonelli, Terry, Stout & Kraus, LLP.

(57) ABSTRACT

A retrieval method targeted for partial characteristic shapes existing in a polyhedral shape is provided. The method converts inputted shape model data into triangular mesh data, extracts and classifies triangular mesh data groups that form the partial characteristic shapes. The method calculates the characteristic amount of the triangular mesh data groups that represent the classified partial characteristic shapes and then calculates the difference between the characteristic amount of the triangular mesh data groups and the characteristic amount of a query shape to display a partial characteristic shape that has a small difference in the characteristic amount or the query shape. Furthermore, the method displays a list of candidates for similar shapes based on the difference value of the characteristic amount.

18 Claims, 6 Drawing Sheets

DATA FLOW DIAGRAM

DATA FLOW DIAGRAM

FLOWCHART

PARTIAL CHARACTERISTIC SHAPE RECOGNITION DIAGRAM

PARTIAL CHARACTERISTIC SHAPE EXTRACTION DIAGRAM

PARAMETER EXTRACTION DURING CHARACTERISTIC AMOUNT CALCULATION

QUERY SHAPE REGISTERING SCREEN

SIMILAR SHAPE RETRIEVAL SCREEN

SIMILAR SHAPE RETRIEVAL RESULT SCREEN

MESH-BASED SHAPE RETRIEVAL SYSTEM

BACKGROUND OF THE INVENTION

The present invention relates to a three-dimensional data processing apparatus, a three-dimensional data processing method and a three-dimensional data processing program. More particularly, the present invention relates to an apparatus, a method or a program that has capabilities to search for a part similar to a predetermined shape from inputted shape models (CAD models, or mesh models) and is able to change the search scope in terms of size and/or topology.

Conventionally, in the field of CAD (Computer Aided Design) or CG (Computer Graphics), methods have been proposed that automatically searches for a model that is similar to the shape models. For example, in a Japanese Laid-open Patent Application JP-A-2001-117907 (Method and system for comparatively retrieving for polyhedral shapes), a system is disclosed in which a polyhedral shape model (polygon model) is digitized from an axial moment function of a polyhedron to search for a model similar to the polyhedral shape model. As just described, there exist publicly known conventional techniques that search for the polyhedral shapes. However, there exists no technique yet for searching for a partial characteristic shape existing within a polyhedral shape.

As an example, in a three-dimensional CAD for designing industrial products, a scene can be supposed in which a housing of a hard disc recorder for receiving and recording a TV broadcasting program is being designed. The housing is created by applying metal sheet bending processing to an aluminum plate. The housing comprises: a printed board in which an element responsible for signal processing, such as DSP, is wired; a panel that includes a button switch for receiving operations by a user and a liquid crystal display device for performing predetermined display; and a switching power source unit for supplying power. Since these components are delivered by different suppliers, each of the components is mounted to the housing by screws of different sizes.

Now, a scene is supposed in which thread holes need to be redesigned during the creation of a design drawing through the use of CAD. If the number of screws to be used is small, a designer just has to search for all the screws imagined by the designer from data within the CAD to perform predetermined redesigning processing including replacement. However, if the number of the screws is enormous, or if the shape of the housing is complicated, only the processing by man's brain can not handle the matter and thereby errors such as edit omission may more likely occur.

In the conventional CAD systems, data on components having common threaded holes or the like are prepared in a CAD data file or a CAD software. Therefore, when the pointer is placed on the component data, further information corresponding to the common threaded holes that exist in the data becomes available, thus enabling the collective designation of CAD data to be created and edited. However, this method is effective only when the components in the data perfectly match a desired shape. Actually, the method does not work well when the components in the data are just similar to the desired shape. In addition, when transmitting and receiving data between different CAD systems, such as between designers and suppliers, if their data format differs, information on the component data will be lost, disabling the search for similar part shapes. Naturally, since some suppliers cannot imagine the same information on the component data as that imagined by the designer, manual searching of the components will possibly lead to more errors.

While in the above example, threaded holes are described, there are a great number of cases in which parts of similar shape are desired to be retrieved in the three-dimensional CAD. Furthermore, the three-dimensional CAD is not limited to the designing of industrial products. Some three-dimensional CADs are used for the creation of CG or the like such as animations. In addition, the technique for retrieving parts of similar shape is adaptable to computer games or the like, thus the present invention being adaptable to a wide variety of applications.

SUMMARY OF THE INVENTION

Therefore, it is an object of the present invention to provide a method, apparatus or program that solves the above problems, and flexibly searches for partially similar shapes from CAD data or the like without depending on the format of the CAD data, and thereby to provide a technology for substantially improving the usability of the three-dimensional CAD.

The present invention for solving the foregoing problems, as described in claim 1, relates to a similar shape retrieval apparatus that comprises: a shape model inputting unit for providing a shape model; a query shape inputting unit for providing a query shape model; a retrieving unit for searching for a part similar to the query shape model from the shape model; and a display unit for displaying any one of the query shape model and the part of the shape model that is determined as being similar to the query shape model.

It should be noted that, as described in claim 2, the retrieving unit is desirably capable of changing the mode of comparison between the query shape model and the shape model in terms of size or topology.

Moreover, as described in claim 3 and 4, the retrieving unit desirably comprises: a shape model meshing unit for meshing the shape model to obtain a shape mesh model; a partial characteristic shape mesh model extracting unit for dividing the shape mesh model into one or more partial characteristic shape mesh models; a partial characteristic shape mesh model characteristic amount calculating unit for calculating the characteristic amount of the partial characteristic shape mesh model; and a characteristic amount comparing unit for comparing the characteristic amount of the partial characteristic shape mesh model with the characteristic amount of the query shape model.

Moreover, as described in claims 5 and 6, the partial characteristic shape mesh model extracting unit desirably comprises a boundary creating unit for creating boundary line data or boundary surface data of the partial characteristic shape model for the shape mesh model.

Furthermore, as described in claim 7, the present invention for solving the foregoing problems relates to a similar shape retrieval method that comprises: a dividing step of dividing a provided shape model into one or more characteristic parts; a searching step of searching for a characteristic part that is similar to a given query shape model from the plurality of characteristic parts; and a displaying step of displaying the characteristic part which is found by the step as being similar or the query shape model.

Moreover, as described in claim 8, the searching step is desirably capable of changing the mode of recognition of similarity between the query shape model and the characteristic part in terms of size or topology.

In addition, as described in claim 9, the present invention for solving the foregoing problems relates to a similar shape retrieval program that comprises: a dividing step of dividing a provided shape model into one or more characteristic parts; a searching step of searching for a characteristic part that is similar to the query shape model from the plurality of characteristic parts; and a displaying step of displaying the characteristic part which is found by the step as being similar or the query shape model.

Furthermore, as described in claim 10, the searching step is desirably capable of changing the mode of recognition of similarity between the query shape model and the characteristic part in terms of size or topology.

Inputted shape model data is converted into triangular mesh data, and a triangular mesh data group for forming a partial characteristic shape is extracted and classified. In other words, single or a plurality of shape model data is or are divided into "components" having a certain characteristic. These are a triangular mesh data converting processing and a partial characteristic shape extracting processing. The characteristic amount of the triangular mesh data group representing the classified partial characteristic shape is calculated, and then the difference between the calculated characteristic amount of the triangular mesh data group and the characteristic amount of the query shape is calculated. Thereafter, the partial characteristic shape that has small difference in the characteristic amount or the query shape is displayed. A list of candidates for similar shapes is also displayed based on the difference value of the characteristic amounts.

According to the present invention, it is possible to flexibly retrieve and display a shape part that is similar to arbitrary query shape data in terms of size or topology. The present invention is a basic technology for providing great usability when handling three-dimensional data, and covers a broad range of applications.

Other objects, features and advantages of the invention will become apparent from the following description of the embodiments of the invention taken in conjunction with the accompanying drawings.

DESCRIPTION OF THE EMBODIMENTS

Embodiments of the present invention will be described below with reference to the accompanying drawings.

Figure 1:
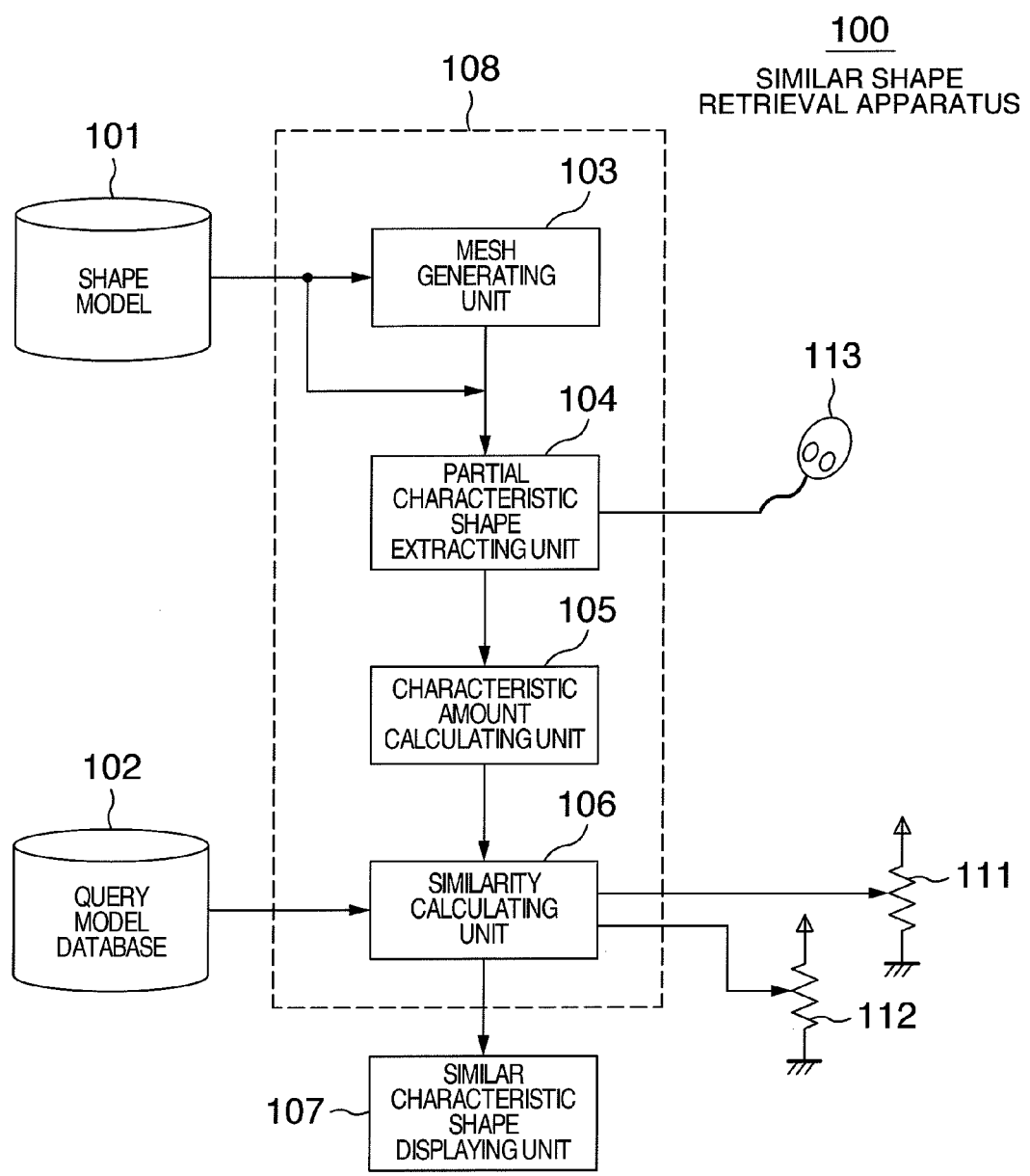
FIG. 1 is a block diagram for a similar shape retrieval apparatus according to an embodiment of the present invention.

FIG. 1 is a functional block diagram disclosing the structure of a similar shape retrieval apparatus 100 according to an embodiment of the present invention. It should be noted that the similar shape retrieval apparatus 100 constitutes part of a three-dimensional CAD system which is not shown. The three-dimensional CAD system is implemented by for example a well-known software which is read into and executed by a personal computer. Shape model data 101 is three-dimensional CAD data to be edited which is stored in a storage medium such as a well-known hard disc. A query model database 102 is an assembly of three-dimensional CAD data (database) comprising many sample query models, which is stored in a storage medium such as the well-known hard disc. In the query model database 102, each record of a relational database has a field indicating three-dimensional query shape data and a field of computation processed characteristic amount data.

A mesh generating unit 103 generates a triangular mesh model from the shape model data 101. More specifically, the mesh generating unit 103 generates a plurality of triangular meshs each becomes an approximate plane on the surface of the shape model data 101. If the shape model data 101 is triangular mesh model data, the conversion processing by the mesh generating unit 103 is not required. Therefore, the shape model data 101 is supplied to a subsequent partial characteristic shape extracting unit 104, just as it is.

The partial characteristic shape extracting unit 104 extracts a partial characteristic shape from a triangular mesh model which is created on the surface of the shape model data 101 by the mesh generating unit 103. More specifically, it recognizes which part is a partial characteristic shape from the triangular mesh model. In the recognition, a normal vector of an arbitrary triangular mesh is obtained, and then the inner product of the obtained normal vector of the arbitrary triangular mesh and a similarly obtained normal vector of an adjacent triangular mesh is calculated. The normal vector is obtained by the outer product of two sides of a triangle and has a length that runs in the direction perpendicular to the surface of the triangle and is proportional to the area of the triangle. If the inner product of normal vectors relating to the adjacent triangular mesh obtained by computation is a threshold value or less, the place is determined to be a boundary line between different partial characteristic shapes, with a boundary of the partial characteristic shapes being created. The boundary line is a connection of sides between the triangular mesh and adjacent triangular mesh. The partial characteristic shapes are extracted by creating the boundary line or boundary surface between the partial characteristic shapes and then by extracting groups of the triangular mesh models that constitute the shape model data 101 in this manner.

A specification operator 113 is connected to the partial characteristic shape extracting unit 104 and specifies a desired part to be searched for from the shape model data 101. The specification operator 113 is a well-known coordinate pointer such as a mouse or pen tablet of a personal computer.

A characteristic amount computing unit 105 quantifies the characteristic amount of the extracted partial characteristic shape that corresponds to the mesh surface groups to create numerical values indicating the shape. The characteristic amount is obtained by selecting arbitrary two triangular mesh data from the group of triangular mesh models that constitute the partial characteristic shape, and by calculating the barycenter distance between the two elements, the sum of angles formed by normal vectors and barycenters of the two elements, and the sum of areas of the two elements. Data on the barycenter, angle and element area is calculated by repeatedly obtaining only the element count that constitutes the group of the triangular mesh models. For example, if n pieces of triangular mesh data that constitute the groups of the triangular mesh models exist in one partial characteristic shape, n (n−1)/2 times of characteristic amount calculations between the elements are required. Finally, the sum total of each barycenter, angle and element area is calculated. In this manner, a "characteristic amount" comprised of a simple scalar quantity is obtained for the partial characteristic shape of various shapes.

The data on the sum total of barycenter distances and the sum total of angles obtained by the characteristic amount calculating unit 105 is a constant amount for the position, size and rotation of an object. When retrieving a model similar to the shape model data 101, the similarity of the shape can be calculated by comparing the barycenter distance with angle data without the requirement of the alignment and adjustment of rotation direction of the model. In contrast, the data on the sum total of the element areas is an amount varying depending only on the size of the object. In other words, it becomes a parameter for considering the size during search.

A similarity calculation unit 106 compares the characteristic amount that comprises the barycenter distance, angle and element area of each partial characteristic shape calculated by the characteristic amount calculating unit 105 with the characteristic amount of each record of the query model database 102 to compute the similarity value. More specifically, the similarity calculation unit 106 searches for the shape similar to each partial characteristic shape that constitutes the shape model data 101 from the query model database 102. In order to determine whether the shape is similar, similarity is calculated. Similarity D is obtained by an equation (1) as follows:

$$D = \sum_k \sum_\alpha \|z1(k, \alpha) - z2(k, \alpha)\| \quad (1)$$

In the equation (1), k is the barycenter distance between the two elements of arbitrary triangular mesh data, and a indicates the sum of angles formed by normal vectors and barycenter line between the two elements of arbitrary triangular mesh data. Z1 (k, α) and Z2 (k, α) indicate the characteristic amount for each of the partial characteristic shape and query sample data. For similarity, the difference of each characteristic amount is calculated, and the lowest value of the sum total of each difference of the barycenter distance and angle is selected as a candidate for the most similar shape.

The obtained sum total of barycenter distances of a certain shape is constant regardless of the size when the shape is similar. The obtained sum total of angles formed by the normal vector and barycenter distance of a certain shape is constant regardless of the size when the shape is similar. In other words, these figures are inherent to the form of the shape. Therefore, the difference of these values in the arbitrary two shapes is obtained, and a shape having a small difference in each value can be regarded as a similar shape.

The acceptable range of similarity as a result of searching is changed by a similarity parameter setting and handling unit 111 which is connected to the similarity calculating unit 106. The similarity parameter setting and handling unit 111 comprises a keyboard and a mouse of a personal computer as an operator, and its entity is a threshold value relative to the similarity provided in a routine of a program constituting the similarity calculation unit 106.

If a search is desired to be conducted in which size is limited, a range specification search may be conducted using previously obtained sum total of areas, with exclusion being conducted later from the similar shape candidate. The size range is changed by a size parameter setting and handling unit 112 which is connected to the similarity calculation unit 106. The size parameter setting and handling unit 112 comprises a keyboard and a mouse of a personal computer as an operator, and its entity is a threshold value relative to the size, which is provided in a routine of a program constituting the similarity calculation unit 106.

A shape (record) selected from the query model database 102 by the similarity calculation unit 106 is passed to a similar characteristic shape displaying unit 107. The similar characteristic shape displaying unit 107 presents a user with a search result by highlighting the shape that is selected by the similarity calculation unit 106 and is most similar to the partial characteristic shape that is extracted by the partial characteristic shape extracting unit 104. In addition, the similar characteristic shape displaying unit 107 is capable of presenting a list of the candidates for shapes similar to the partial characteristic shape as a result of the similarity calculation such that the user can refer to the retrieving result.

In the above embodiment, records of shapes similar to the partial characteristic shape which is specified by the specification operator 113 are searched for from the query model database 102, and a list of the candidates is displayed in the order of similarity. However, the present invention is not limited to the above embodiment. An embodiment is also contemplated in which the mesh generating unit 103 collectively processes the entire shape model data 101, the partial characteristic shape extracting unit 104 divides the processed shape model data into a plurality of partial characteristic shapes, and then records that are similar to all the partial characteristic shapes are searched for from the query model database 102 and are displayed by the similar characteristic shape displaying unit 107.

In the foregoing embodiment, similar shapes are retrieved from the query model database 102 in which the calculation of the characteristic amount of the recorded shape is previously conducted, and a list of candidates is displayed in the order of similarity. However, there is no limitation thereto. An embodiment is also contemplated, in which after the user inputs a shape to be searched as arbitrary query model data, the mesh generating unit 103 and characteristic amount calculating unit 105 calculate the characteristic amount thereof, creates a single record as the query model database 102, and highlight a partial characteristic shape of the shape model data 101, which is similar to the query shape model of the record by means of the similar characteristic shape displaying unit 107.

The display method conducted by the similar characteristic shape displaying unit 107 is not limited to the highlighting. Various modes of expression are considered including changing brightness, changing display color, reversing display, blinking, thick line display, enclosure display and the like.

Figure 2:
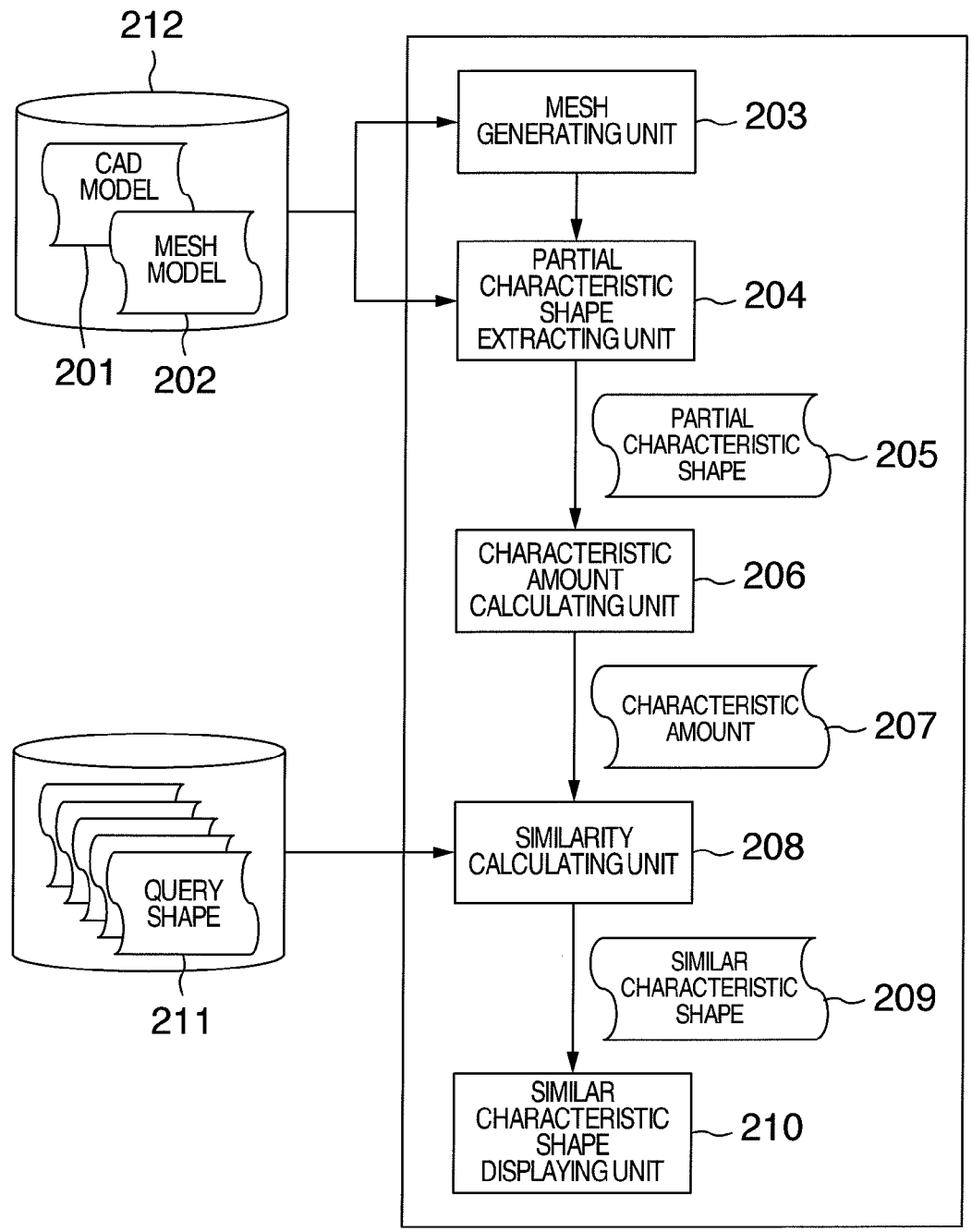
FIG. 2 is a data flow diagram for a similar shape retrieval apparatus according to an embodiment of the present invention.

FIG. 2 is a functional block diagram disclosing a data flow in a similar shape retrieval apparatus according to an embodiment of the present invention.

A CAD model 201 and a mesh model 202 are stored in a query model database 212. The CAD model 201 is passed to a mesh generating unit 203. The mesh model 202 is passed to a partial characteristic shape extracting unit 204. When an input model is the CAD model 201, it is transmitted to the mesh generating unit 203, and then transmitted to the partial characteristic shape extracting unit 204 after surface mesh data is created. However, when the input model is the mesh model 202, it is not transmitted to the mesh generating unit 203, but is directly transmitted to the partial characteristic shape extracting unit 204. In both cases where the input model is the CAD model and where the input model is the mesh model, a partial characteristic shape 205 is extracted from the mesh by the partial characteristic shape extraction unit 204. A mesh surface group is classified for each characteristic shape from the mesh data and a partial characteristic shape is created. The created partial characteristic shape is transmitted to a characteristic amount calculating unit 206 where a characteristic amount is calculated. The characteristic amount is obtained from the angle and distance between arbitrary two elements and the area of mesh elements. The obtained characteristic amount data 207 is transmitted to a similarity calculating unit 208. At the similarity calculating unit 208, similarity is calculated from the characteristic amount of a query shape 211 and the characteristic amount of the partial characteristic shape. The similarity is obtained from the difference between the characteristic amount of the query shape and the characteristic amount of the partial characteristic shape. As a result of the similarity calculation, a shape that is most similar to the query shape is selected and is transmitted to a similar characteristic shape displaying unit 210 as a similar characteristic shape 209. At a similar characteristic shape displaying unit 210, the most similar characteristic is displayed in input model data as a result of the similarity calculation. The display method includes the intensified display or highlight display. At the similar characteristic shape displaying unit, all results of the similarity calculation are also displayed. This enables the user to refer to the result of similarity search. The user is capable of referring to a list of the search results. It can be referred to as the search results list.

Figure 3:
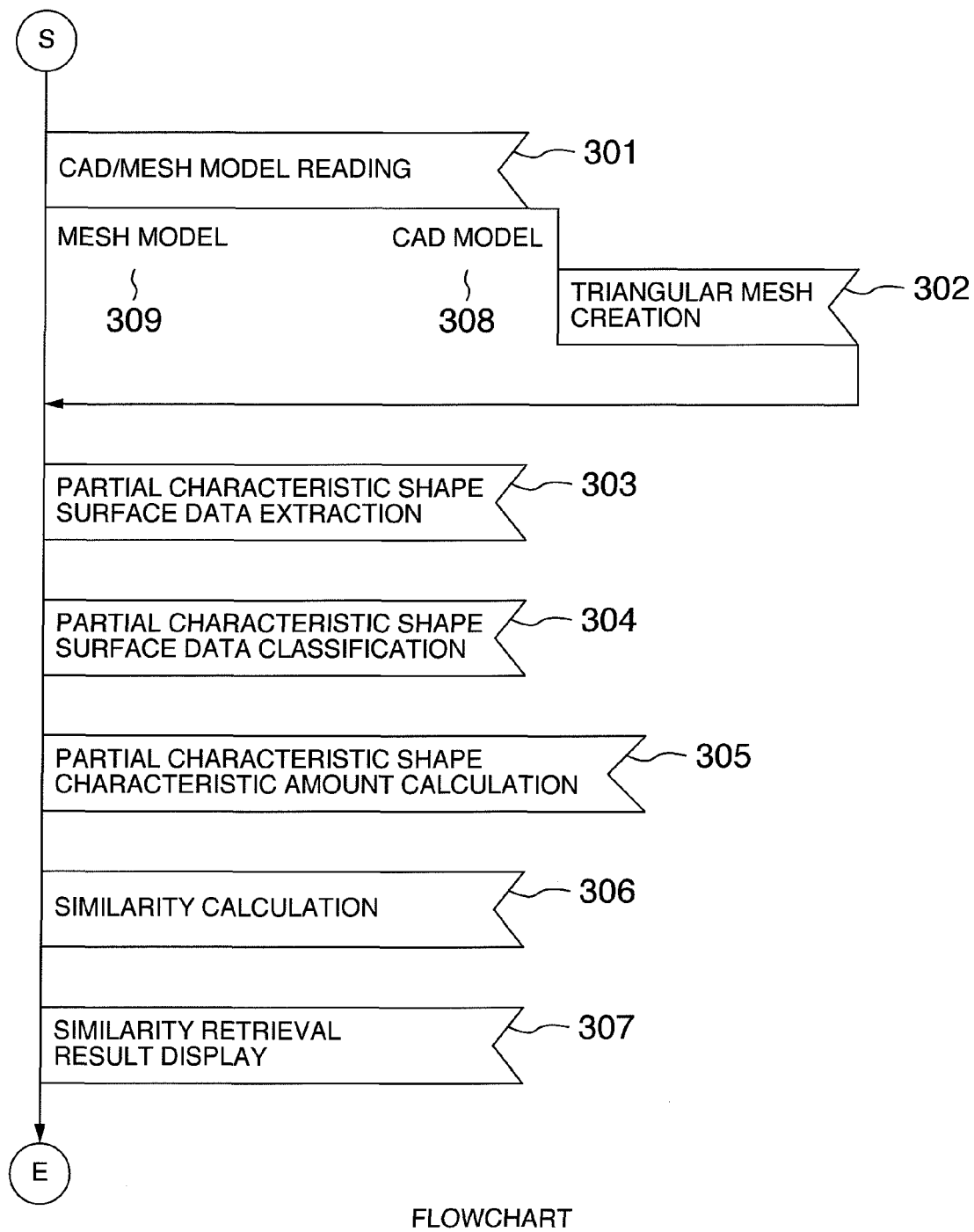
FIG. 3 is a flow chart for a similar shape retrieval apparatus according to an embodiment of the present invention.

FIG. 3 shows a process flow chart of a similar shape retrieval system. The system first reads a CAD/mesh model (301). When the read model is the CAD model (308), after a triangular mesh is created (302), the triangular mesh is used to extract partial characteristic shape surface data (303). When the read model is the mesh model (309), the mesh is not created, and existing mesh data is used to extract a mesh surface group by the partial characteristic shape surface data extracting unit. From the extracted mesh surface group, the partial characteristic shape surface data group is classified (304). From surface data for expressing the partial characteristic shape, necessary shapes are classified. From the surface data, surface data corresponding to the characteristic shape part is extracted, thus the shapes being classified.

Figure 4:
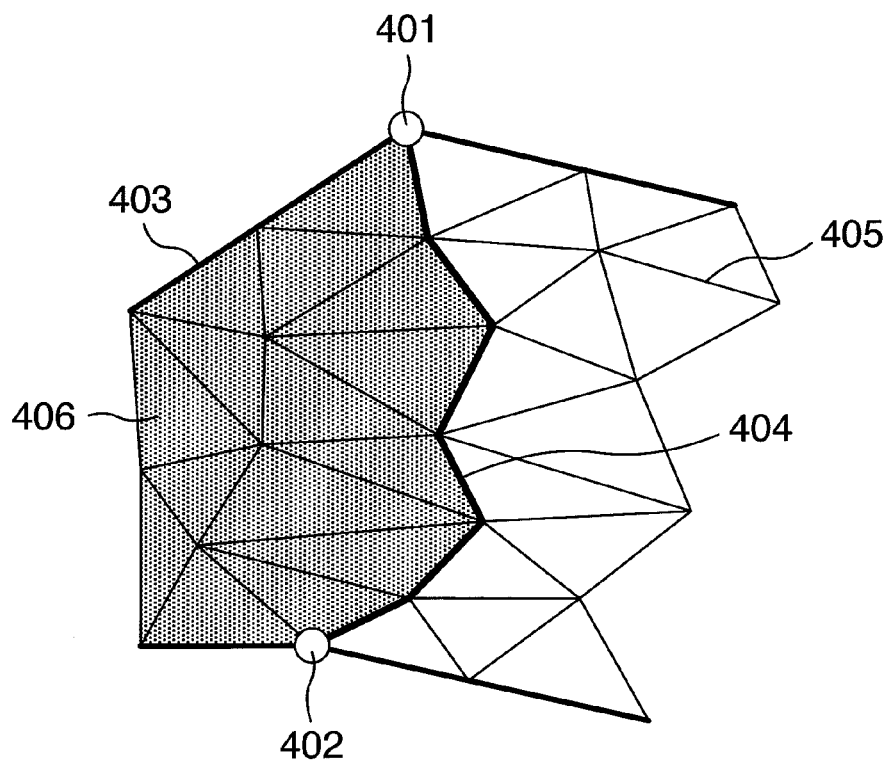
FIG. 4 is a schematic diagram showing a method of extracting a partial characteristic shape from groups of triangular mesh models.

FIG. 4 is a diagram showing a method of extracting a partial characteristic shape from groups of triangular mesh models in the partial characteristic shape extracting unit 104 shown in FIG. 1. A boundary line is set to surface groups of triangular mesh data. An angle formed by the element of arbitrary triangular mesh data and adjacent element is calculated from the inner product of the normal vectors of the elements within the range of outline 403 of surface group, and when the inner product is a threshold value or less, intersection points 401 and 402 of the outer line and the boundary line are determined using an element side of the element of triangular mesh data as the boundary line 404, and then the surface groups of the triangular mesh data are extracted. By means of the boundary line created as described above, a partial characteristic shape is extracted separately for the triangular mesh surface groups 405 and 406.

Figure 5:
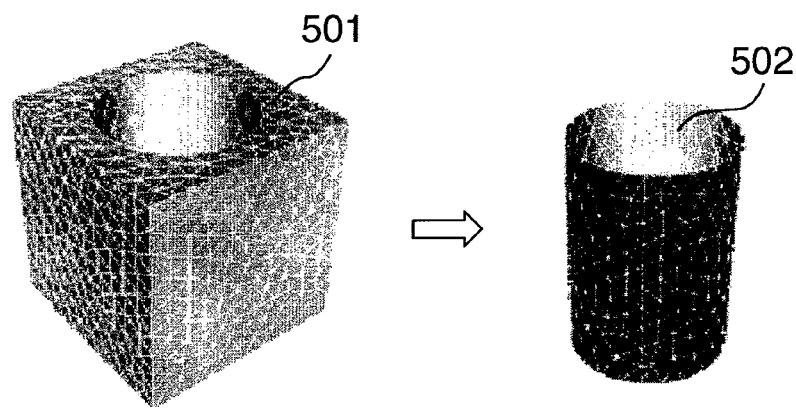
FIG. 5 is a schematic diagram showing an exemplary operation for recognizing a partial characteristic shape from shape model data.

FIG. 5 is an example in which when a hole exists in shape model data 501 which is a regular hexahedron, a cylinder part constituting the hole is recognized as a partial characteristic shape 502. The partial characteristic shape is extracted by determining a boundary line of the partial characteristic shape included in the shape model data 501. In the example of FIG. 5, the inner product of normal vectors in the peripheral part of the hole is 0 since the angle is 90 degrees.

Figure 6:
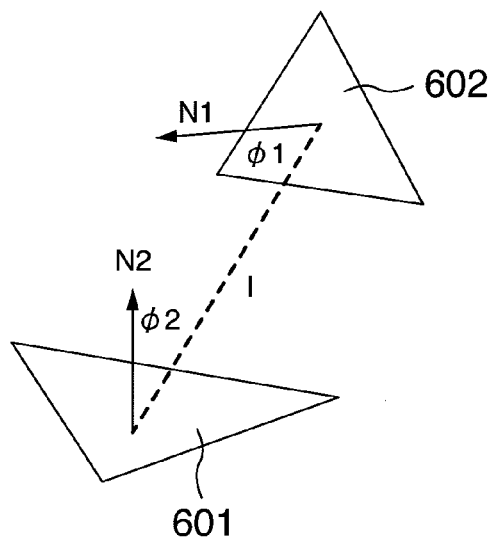
FIG. 6 is a schematic diagram showing a method of calculating a characteristic amount from two triangular mesh data elements.

FIG. 6 shows a method of calculating a characteristic amount from elements of arbitrary two triangular mesh data of a triangular mesh surface group that constitutes an extracted partial characteristic shape. First, arbitrary two elements 601 and 602 are selected from the triangular mesh surface group that constitutes the partial characteristic shape. Next, the barycenter distance between the selected two elements and angles are computed to calculate the characteristic amount of the partial characteristic shape. The barycenter distance is the length of a line segment 1 connecting the barycenters of the two elements. An angle is calculated as the sum of angles $\phi 1$ and $\phi 2$ which are formed by normal vectors N1 and N2, which are previously calculated, and the line segment 1 connecting the barycenters of the two elements. The barycenter distance and angle of all the triangular mesh surface groups constituting the partial characteristic shapes are computed in the same manner as the above, and each computed result is cumulatively added. Obtained values indicate the sum total of barycenter distances and the sum total of the angles. As the form of partial characteristic shape becomes more and more complicated, the number of triangular mesh surface groups, which are obtained by converting the partial characteristic shape, increases. In response to the increase, the sum total of the barycenter distances and the sum total of the angles increase. In other words, the sum total of the barycenter distances and the sum total of the angles are amounts that depend on the shape. The calculation of the similarity is executed using the equation (1). The similarity calculation using the equation (1) calculates the distance between the characteristic amount of the partial characteristic shape and the characteristic amount of the query shape. The difference of the sum total of the barycenter distances and difference of sum total of the angles between the partial characteristic shape and query shape are calculated. If the obtained difference of the sum total of the barycenter distances and difference of the sum total of angles are added, then the distance is obtained. The smaller the distance is, the more similar the shape is.

Topologically similar shapes can be retrieved by lowering a threshold of similarity. Lowering the similarity threshold, e.g., expanding the region of the target shape, allows the range of the shape being retrieved to be expanded. For example, if a large parameter is used when searching a threaded hole that is provided at a plate constituting a housing of an apparatus and does not pass through the plate, not only the threaded hole but also a hollow is included in the search range and it can be found. In the same way, if a large parameter is chosen when searching a threaded hole that passes through the plate, an exhaust hole and the like will be included in the search region in addition to the threaded hole, and they can be found. The present invention uses mesh information to perform similarity search. Therefore, the present invention allows shapes to be found that are similar although different in the topological construction.

Figure 7:
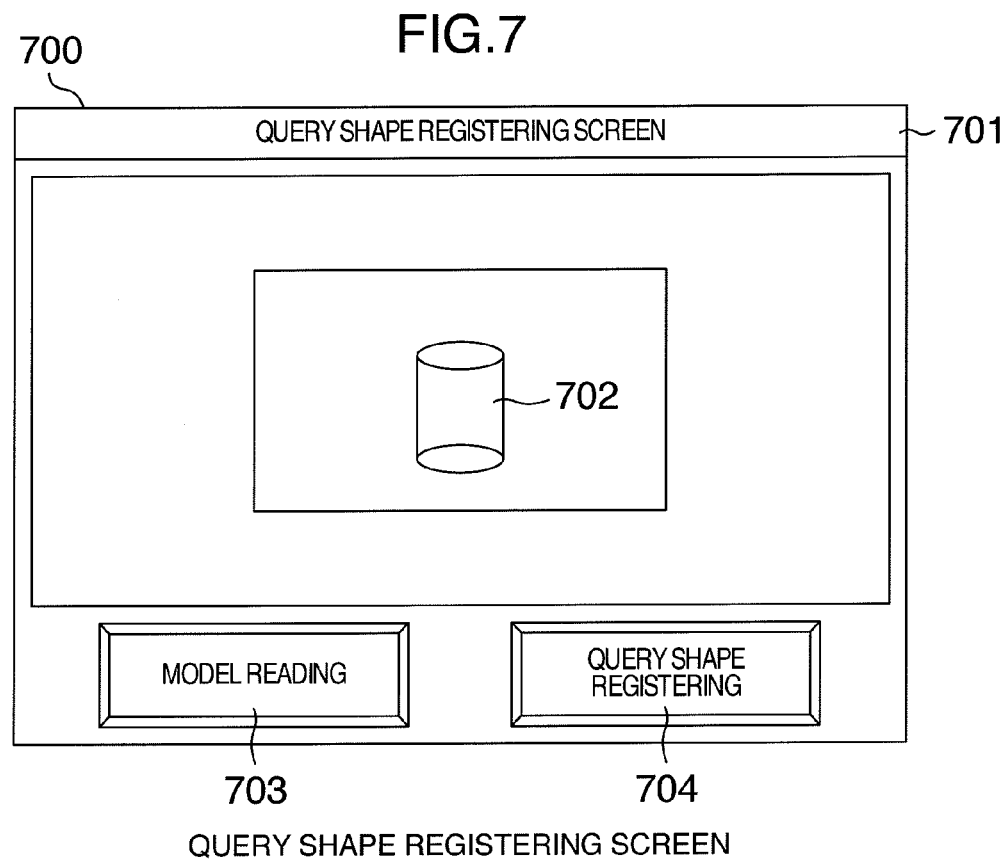
FIG. 7 is a schematic diagram showing a conceptual drawing of an operation screen for registering a query shape.

FIG. 7 is a conceptual drawing of an operation screen. A query shape registering function 700 registers query shapes to be searched in a similar shape retrieval function which is later described. A query shape registering screen 701 is capable of reading and registering query shapes. If a "model reading" button 703 on the screen is pushed, a shape model 702 is displayed. If a "query shape registering" button 704 is pushed, the characteristic amount of the inputted shape model is calculated and registered in the query model database 102 shown in FIG. 1 together with the shape model. It is also possible to register the partial characteristic existing in the shape model data 101 of FIG. 1 as the query shape by pickup designation with a mouse. In this manner, it is possible to additionally register the arbitrary query shape in the query model database 102 of FIG. 1 as the user desires.

Figure 8:
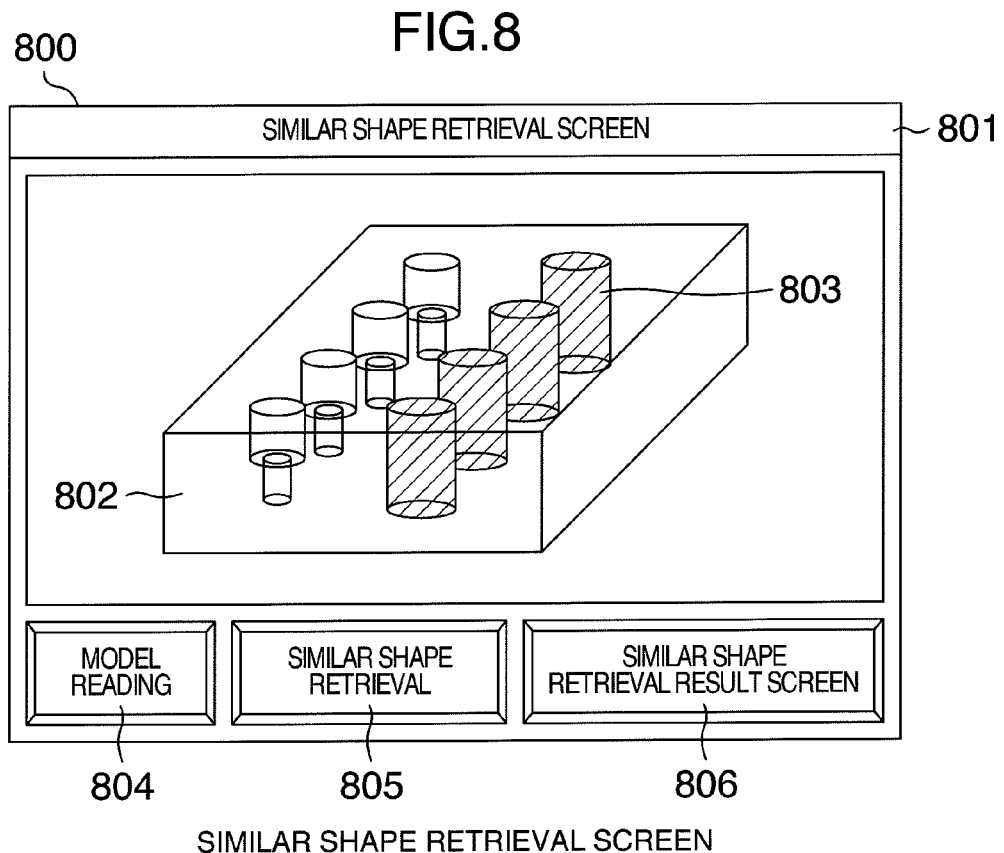
FIG. 8 is a schematic diagram showing a conceptual drawing of a similar shape retrieving screen.

FIG. 8 is a conceptual drawing of a similar shape retrieval screen. A similar shape retrieving function 800 checks if a read shape model has a partial characteristic shape that bears resemblance to the shape registered in the query model database 102 shown in FIG. 1. A similar shape retrieval screen 801 is capable of reading a shape model 802 to search for a partial characteristic shape similar to the shape registered in the query model database 102 and to display the search result. First, if a "model reading" button 804 is pressed, the shape model 802 is read. Next, a check is performed if the shape model 802 has a partial characteristic shape similar to a desired shape. If a "similar shape retrieval" button 805 is pressed, partial characteristic shapes in the shape model 802 are extracted, and a partial characteristic shape similar to the desired query shape that is designated by the user from each partial characteristic shape is searched for. After the search, a partial characteristic shape 803 that is most similar to the desired query shape is highlighted. In addition, if a "similar shape retrieval result screen" 806 is pressed, it is possible to refer to the result of the similarity calculation for other than the most similar shape.

Figure 9:
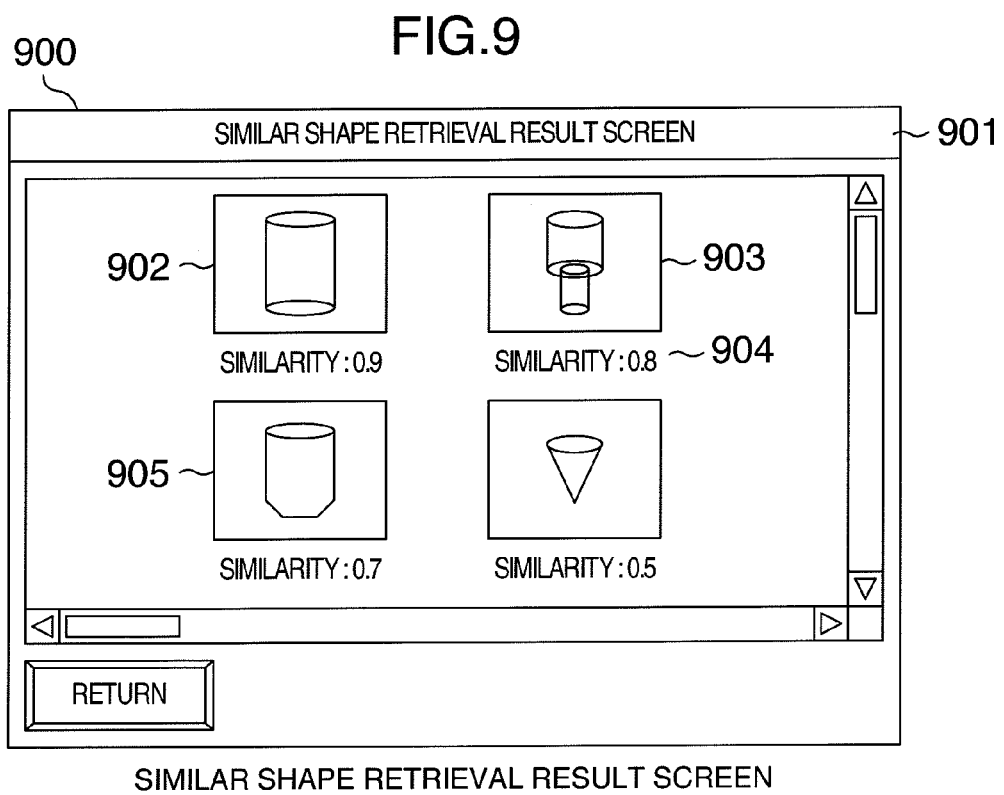
FIG. 9 is a schematic diagram showing a conceptual drawing of a similar shape retrieving result screen.

FIG. 9 is a conceptual drawing of a similar shape retrieval result screen. A similar shape retrieval result display function 900 displays a list of the results of similar shape search on the similar shape retrieval result screen 901. The similar shape retrieval result function 900 calculates the similarity of the partial characteristic shapes contained in the shape model 802 of FIG. 8 to the query shape to display partial characteristic shapes 902 and 903. It also displays similarity calculation results 904. If a "return button" 905 is pressed, processing returns to the similar shape retrieval screen 801 of FIG. 8.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A similar shape retrieval apparatus, comprising:
   a shape model inputting unit;
   a query shape inputting unit for providing a query shape model;
   a shape model meshing unit for meshing a shape model to obtain a shape mesh model including a plurality of mesh elements on a surface of the shape model;
   a partial characteristic shape mesh model extracting unit for calculating an inner product of normal vectors of adjacent mesh elements in said shape mesh model, setting a line between the adjacent mesh elements as a boundary line of different surface groups of mesh elements respectively including the adjacent mesh elements when the calculated inner product of normal vectors of the adjacent mesh elements is a threshold value or less, and extracting a partial characteristic shape separately for the different surface groups;
   a partial characteristic amount calculating unit for calculating a characteristic amount of the partial characteristic shape mesh model using a barycenter distance between mesh elements and normal vectors of said mesh elements in said partial characteristic shape mesh model;
   a searching unit for searching for a part of said shape model similar to said query shape model based on the characteristic amount of the partial characteristic shape mesh model; and
   a display part for displaying any one of the query shape model and the searched part of the shape model which is determined to be similar by said searching unit.

2. The similar shape retrieval apparatus according to claim 1, wherein:
   said searching unit is capable of modifying the mode of comparison between said query shape model and the unit of said shape model in terms of size or topology.

3. The similar shape retrieval apparatus according to claim 1, wherein said searching unit comprising:
   a query shape model meshing unit for meshing said query shape model to obtain a query shape mesh model including a plurality of mesh elements on the surface of the query shape model;
   a partial characteristic query shape mesh model extracting unit for dividing said query shape mesh model into one or more partial characteristic query shape mesh models in accordance with an inner product of normal vectors of adjacent mesh elements;
   a partial characteristic query shape mesh model characteristic amount calculating unit for calculating a characteristic amount of said partial characteristic query shape mesh model using a barycenter distance between mesh elements and normal vectors of said mesh elements in said partial characteristic query shape mesh model; and
   a characteristic amount comparing unit for comparing the characteristic amount of said partial characteristic shape mesh model with the characteristic amount of said partial characteristic query shape mesh model.

4. The similar shape retrieval apparatus according to claim 2, wherein said searching unit comprising:
   a query shape model meshing unit for meshing said query shape model to obtain a query shape mesh model including a plurality of mesh elements on the surface of the query shape model;
   a partial characteristic query shape mesh model extracting unit for dividing said query shape mesh model into one or more partial characteristic query shape mesh models in accordance with an inner product of normal vectors of adjacent mesh elements;
   a partial characteristic query shape mesh model characteristic amount calculating unit for calculating a characteristic amount of said partial characteristic query shape mesh model using a barycenter distance between mesh elements and normal vectors of said mesh elements in said partial characteristic query shape mesh model; and
   a characteristic amount comparing unit for comparing the characteristic amount of said partial characteristic shape mesh model with the characteristic amount of said partial characteristic query shape mesh model.

5. The similar shape retrieval apparatus according to claim 3, wherein said partial characteristic shape mesh model extracting unit comprising:
   a boundary creating unit for creating boundary line data or boundary surface data of the partial characteristic shape model for said shape mesh model.

6. The similar shape retrieval apparatus according to claim 4, wherein said partial characteristic shape mesh model extracting unit comprising:
   a boundary creating unit for creating boundary line data or boundary surface data of the partial characteristic shape model for said shape mesh model.

7. A similar shape retrieval method effected via a processor, comprising:
   inputting a query shape model;

meshing a shape model to obtain a shape mesh model including a plurality of mesh elements on a surface of the shape model;

calculating an inner product of normal vectors of adjacent mesh elements in said shape mesh model, setting a line between the adjacent mesh elements as a boundary line of different surface groups of mesh elements respectively including the adjacent mesh elements when the calculated inner product of normal vectors of the adjacent mesh elements is a threshold value or less, and extracting a partial characteristic shape separately for the different surface groups;

calculating a characteristic amount of the partial characteristic shape mesh model using a barycenter distance between mesh elements and normal vectors of said mesh elements in said partial characteristic shape mesh model;

searching for a part of said shape model similar to said query shape model based on the characteristic amount of the partial characteristic shape mesh model; and displaying any one of the query shape model and the searched part of the shape model which is determined to be similar by the searching.

8. The similar shape retrieval method according to claim 7, wherein:

the searching includes modifying a mode of comparison between said query shape model and the unit of said shape model in terms of size or topology.

9. The similar shape retrieval method according to claim 7, wherein the searching comprising:

meshing said query shape model to obtain a query shape mesh model including a plurality of mesh elements on the surface of the query shape model;

dividing said query shape mesh model into one or more partial characteristic query shape mesh models in accordance with an inner product of normal vectors of adjacent mesh elements;

calculating a characteristic amount of said partial characteristic query shape mesh model using a barycenter distance between mesh elements and normal vectors of said mesh elements in said partial characteristic query shape mesh model; and comparing the characteristic amount of said partial characteristic shape mesh model with the characteristic amount of said partial characteristic query shape mesh model.

10. The similar shape retrieval method according to claim 8, wherein the searching comprising:

meshing said query shape model to obtain a query shape mesh model including a plurality of mesh elements on the surface of the query shape model;

dividing said query shape mesh model into one or more partial characteristic query shape mesh models in accordance with an inner product of normal vectors of adjacent mesh elements;

calculating a characteristic amount of said partial characteristic query shape mesh model using a barycenter distance between mesh elements and normal vectors of said mesh elements in said partial characteristic query shape mesh model; and comparing the characteristic amount of said partial characteristic shape mesh model with the characteristic amount of said partial characteristic query shape mesh model.

11. The similar shape retrieval method according to claim 9, wherein the dividing said query shape mesh model comprising:

creating boundary line data or boundary surface data of the partial characteristic shape model for said shape mesh model.

12. The similar shape retrieval method according to claim 10, wherein the dividing said query shape mesh model comprising:

creating boundary line data or boundary surface data of the partial characteristic shape model for said shape mesh model.

13. A non-transitory processor-readable medium embodying a similar shape retrieval program which if effected via a processor, effects operations comprising:

inputting a query shape model;

meshing a shape model to obtain a shape mesh model including a plurality of mesh elements on a surface of the shape model;

calculating an inner product of normal vectors of adjacent mesh elements in said shape mesh model, setting a line between the adjacent mesh elements as a boundary line of different surface groups of mesh elements respectively including the adjacent mesh elements when the calculated inner product of normal vectors of the adjacent mesh elements is a threshold value or less, and extracting a partial characteristic shape separately for the different surface groups;

calculating a characteristic amount of the partial characteristic shape mesh model using a barycenter distance between mesh elements and normal vectors of said mesh elements in said partial characteristic shape mesh model;

searching for a part of said shape model similar to said query shape model based on the characteristic amount of the partial characteristic shape mesh model; and displaying any one of the query shape model and the searched part of the shape model which is determined to be similar by the searching.

14. The non-transitory processor-readable medium according to claim 13, wherein:

the searching includes modifying a mode of comparison between said query shape model and the unit of said shape model in terms of size or topology.

15. The non-transitory processor-readable medium according to claim 13, wherein the searching comprising:

meshing said query shape model to obtain a query shape mesh model including a plurality of mesh elements on the surface of the query shape model;

dividing said query shape mesh model into one or more partial characteristic query shape mesh models in accordance with an inner product of normal vectors of adjacent mesh elements;

calculating a characteristic amount of said partial characteristic query shape mesh model using a barycenter distance between mesh elements and normal vectors of said mesh elements in said partial characteristic query shape mesh model; and comparing the characteristic amount of said partial characteristic shape mesh model with the characteristic amount of said partial characteristic query shape mesh model.

16. The non-transitory processor-readable medium according to claim 14, wherein the searching comprising:

meshing said query shape model to obtain a query shape mesh model including a plurality of mesh elements on the surface of the query shape model;

dividing said query shape mesh model into one or more partial characteristic query shape mesh models in accordance with an inner product of normal vectors of adjacent mesh elements;

calculating a characteristic amount of said partial characteristic query shape mesh model using a barycenter distance between mesh elements and normal vectors of said mesh elements in said partial characteristic query shape mesh model; and comparing the characteristic amount of said partial characteristic shape mesh model with the characteristic amount of said partial characteristic query shape mesh model.

17. The non-transitory processor-readable medium according to claim 15, wherein the dividing said query shape mesh model comprising:

creating boundary line data or boundary surface data of the partial characteristic shape model for said shape mesh model.

18. The non-transitory processor-readable medium according to claim 16, wherein the dividing said query shape mesh model comprising:

creating boundary line data or boundary surface data of the partial characteristic shape model for said shape mesh model.

* * * * *